United States Patent [19]

Ramirez

[11] 4,012,319

[45] Mar. 15, 1977

[54] WASTE WATER TREATMENT

[75] Inventor: Ernest R. Ramirez, Lemont, Ill.

[73] Assignee: Swift and Company, Chicago, Ill. Chicago, Ill.

[22] Filed: Dec. 1, 1975

[21] Appl. No.: 636,513

Related U.S. Application Data

[63] Continuation of Ser. No. 438,737, Feb. 1, 1974, abandoned.

[52] U.S. Cl. .................................. 210/44; 204/149
[51] Int. Cl.$^2$ ...................... B03D 1/00; C02C 5/12
[58] Field of Search .................. 210/10, 44, 221 M; 204/149–152

[56] References Cited

UNITED STATES PATENTS

| | | |
|---|---|---|
| 3,479,281 | 11/1969 | Kikindai et al. .................. 210/44 |
| 3,505,188 | 4/1970 | Pan ..................................... 210/44 |
| 3,726,780 | 4/1973 | Harnden et al. ..................... 210/44 |
| 3,816,274 | 6/1974 | Anderson ............................ 210/44 |
| 3,822,204 | 7/1974 | Sako ................................... 210/44 |

*Primary Examiner*—Thomas G. Wyse
*Attorney, Agent, or Firm*—Edward T. McCabe; Charles E. Bouton; Raymond M. Mehler

[57] ABSTRACT

Waste water containing suspended particles such as mineral oil, fats, proteins, fibers, and biodegradable materials, etc., is clarified by passing said water over a plurality of electrode banks whereby gradient current density zones and gradient energy zones are used to create microbubbles which float the particles to the surface where they may be skimmed off.

17 Claims, No Drawings

WASTE WATER TREATMENT

This is a continuation, of application Ser. No. 438,737, filed Feb. 1, 1974 now abandoned.

This invention is concerned with a method for treatment of waste waters and other effluents containing emulsified amounts of oils, fats, greases and other oily materials which may not contain proteins, biodegradable materials and other polar substances. The process is especially useful in connection with edible oil operations or with packinghouse operations, but can also be used to advantage in the treatment of effluent containing mineral oils from industrial plants. Accordingly, the invention relates to the removal of a phase by flotation from a liquid containing the phase.

There are, in various fields of industry, effluents from the operating processes, usually aqueous which contain a seperable phase. In the polar industry, for example, the effluent from the manufacturing process contains cellulose, fibers and sometimes mineral fillers such as kaolin. In the meat industry, the waste from the abattoirs contain animal fats, proteins and other organic materials. In the manufacture of iron products so as in rolling mills, effluent waters contain oil and particles of iron. In the petroleum industry, numerous products having densities lower than that of water are separable only with difficulty using ordinary methods such as decantation or centrifugation. Some industrial processes contain phases which are hydrophobic such as the latex or plastics industries. Clearly, many of the rivers and streams of the world are contaminated with all sorts of insoluble and suspended organic and inorganic materials.

Generally speaking, free fat and oil, i.e., not emulsified fat and oil, present no serious problems in regard to separation from water they generally float to the surface and can be skimmed off. Emulsified fats, on the other hand, stay in solution, causing severe pollution problems. In this connection, it has been the usual practice in the past to run the waste water from the packinghouse to a settling tank or basin having baffles wherein the water would set for an hour or so and the free fat would rise to the top and be skimmed off. The emulsified fat would of course remain in the water and would accompany it to the sewers. Various means, such as aeration and complex apparatus have been employed in attempts to de-emulsify the waste waters. Usually, however, unless the emulsified oil was very valuable, no effort was made to recover it from the water that was eventually passed to the sewers and hence to the streams and rivers.

In processes where water is reused, the oil can be removed from the system by coagulation with aluminum sulfate and alkali, followed by filtration. The oil is caught in the floc and filtered out of the system. However, periodic backwashes of the filter with hot caustic soda are required. It should be noted, however, that the processes used to completely remove the oil from the water are clearly uneconomical for use in cleaning up waste water from packinghouses, petroleum industry waste and edible oil operations.

In order to resolve the problem of separating a suspended phase from waste water, various industrial processes have used the technique of flotation by introducing bubbles of gas into the liquid which attach themselves to the particles of the separable phase, which may be either solid or liquid, imparting an apparent density to the particles which causes them to be lifted out of the liquid which contains them and which transports them to the surface from whence they can be removed. The flotation processes and apparatuses heretofore known possess a major difficulty in that bubbles of gas produce substantial turbulence in the volume of the liquid immediately above the point in which the bubbles are released, this turbulence acting to carry impurities into the clarified liquid. As there was no possibility of increasing the number of bubbles to any substantial extent, e.g., to produce froth, the liquid effluent was difficult to clarify and the purification was onerous.

Accordingly, it is one object of this invention to quickly and efficiently remove foreign, dissolved and/or suspended materials from waste water.

It is another object of this invention to remove suspended particles from waste water without producing stream turbulence throughout the clarification zone.

In general, this invention is concerned with the treatment of water systems containing suspended or dissolved particles by subjecting the water to a plurality of gradient current density zones. Each current zone contains an electrode bank comprising a grid or electrode pairs having an important relationship to the amount of impurities in the water. Ideally, the average current density at the bottom of the tank is diminished as the water passes through a treating tank. This is accomplished by varying the voltage, the amperage, the distance between electrodes or the arrangement of the electrodes as will be brought out more in detail as the specification proceeds.

It should be mentioned at this time that two types of current densities are discussed in this specification. There is a current density produced at the electrodes which is real and there is one found at the tank bottom which is imaginary but calculatable. There is an unlimited number of ways to produce a gradient of current densities at the tank bottom. For example, if the amperage at the electrode remains constant, the average current density per square foot of tank bottom will diminish if the electrode pairs are placed farther apart or the distance between anode and cathode is increased.

Most waste waters, especially from meat treating operations are edible oil plants have one common denominator, i.e., the presence of suspended, charged, solid particles which will not settle even if allowed to stand for months on end. It is generally recognized that in the usual situations more than 90% of the suspended solids are negatively charged. In order to precipitate these particles, the charge must be brought to zero. At zero charge, the particles will precipitate and form a floc, some of which may arise and some of which may fall. It is possible to coagulate some particles in industrial waste water by simply changing the pH of the solution.

In addition, positively charged particles, i.e., metal ions are usually added to waste water. These positively charged particles attach to the negative particles already in the waste water and bring about an over-all zero charge in the solution with resultant coalescence of the particles. Ferric chloride, ferric sulfate, aluminum salts such as alum all of which form their respective insoluble metal hydroxides in the solution are positively charged particles useful in this invention to treat industrial waste water.

A further improvement in producing flocs to rise to the surface comprises the addition of synthetic polymers to the water, such polymers usually being of the polyacrylamide type. These technical polymer flocculants of water-soluble polymers range from moderate molecular weights of 7 million to the highest practical limit and include weak, medium and strong charge densities.

In treating waste water from a plant, about 100–1000 ppm, usually about 300–400 ppm of alum or other multivalent metal salt will be placed in the influent pipe usually about 20 feet ahead of the tank. Very gentle mixing is desired and extreme agitation is avoided. After a few minutes of mixing a small amount, about 0.1 to about 5 ppm of a polyelectrolyte is added to the system. The waste water is allowed to flow over a plurality of electrodes creating a current density gradient at the tank bottom. The current density zones are created by the use of a plurality of electrode banks lying near the bottom of the tank floor. The current densities used are related to the amount of solid, foreign material in the waters above the grid. The higher the concentration of foreign materials present the higher must be the effective current density employed. Further, average current densities per unit of tank bottom at the influent end is sunbstantially greater (about 2–100 times, preferable more than 10 times greater) than that at the effluent end. The gradient from one end of the tank to the other may be step-wise or gradual.

In this invention, it is preferred to have the electrode banks extend over substantially the entire surface of a treating tank at or near the bottom of the tank. The current density that is referred to in this invention is meant to be amps per square feet of tank bottom covered by the electrode bank, even though the anode and cathode structures be made of mesh wire, open grid (70% open area) or spaced wire or electrode pairs. Good results have been obtained in using sheets of hexagonal patterned stretch metal for cathodes with rod-shaped anodes sandwiched in between. However, one may use any sort of open area design.

The invention stipulates that optimum results are obtained if two or more ranges of current density values are used in a single waste treating tank. The invention also encompasses the use of a gradient of energy input from one end of the tank to the other. Energy input is the product of current times voltage, i.e., watts, and like current density, the average energy input per unit area of tank bottom at the influent end should be substantially greater than that at the effluent end. When the voltage is constnt, wattage is directly proportional to the amperage.

Generally, a waste water treating tank will vary in size depending upon the amount of water being treated. In order to treat 600 gallons per minute of industrial waste water, for example, the following dimensions would be considered realistic: length 40 feet; width 15 feet; and depth 4½ feet.

Since there is a critical relationship between optimum current density of the anode-cathode grid or electrode pairs and the amount of impurities in the water, it follows that ideally the current density in the electrode banks should be diminished as the water passes through the treating tank. Ideally, the invention can best be applied by dividing a treating tank into four banks sections. However, it is specifically pointed out that three sections, five sections, or additional sections may be employed. In a four zone clarification tank the current density in the second section is a fraction of that in the first section and is approximately half that in the first section. Subsequent current density zones are diminished usually by a factor of about one-half. For example, if the current density in the first section (closest to the influent end) lies between about 3 to 20 amps per square foot of tank bottom over that section; the second section would have a current density of about 2.5 to 10 amps per square foot. The third section will have about 1.25 to 5 amps per square foot; while the last section will have about ½ to 2½ amps per square foot.

When using anode-cathode grids, the present invention defines the optimum space in between the anode and cathode to be somewhere between 0.25 inches and 2 inches. It is possible to operate an anode-cathode grid beyond the 2 inch spacing but the power consumed becomes even larger with larger distances. It is pointed out that it is very important that the anode-cathode grid be as far away from the skimming surface as possible. If the spacing is much greater than 8 inches from the bottom of the tank, some of the desired neutralization and coagulation is irretrievably lost.

In a specific embodiment of this invention, a flotation tank of 16 to 20 feet long, approximately 5 to 6 feet high and 7 feet wide was utilized. Both the inlet and exit conduits are about 5 feet from the bottom of the tank. The tank was divided into four electrochemical or current density sections employing four banks of cells covering essentially the entire bottom of the tank and placed as close to the bottom of the tank as possible. All four cells are operated in parallel with one rectifier.

The first bank or anode-cathode grid (nearest the influent end) comprised two cathodes and one set of cylindrical or rod-shaped anodes spaced equal distance between the cathodes. The cathodes were stretched mild steel, rectangular plates (grids) and between 1/16 and ¼ inch thickness with about 66 to 70% openings. Each opening was about 0.6 inches × 1.7 inches. Eleven ferrosilicon anode rods, 5 feet 4 inches in length and 1½ inches in diameter, were sandwiched between the cathodes. The bottom cathode was rested 4 inches from the tank bottom and it, along with the top cathode, was separated from the anodes by non-conducting material. All anodes were on one plane, but offset from each other about 6 inches. They lied transverse to the flow of water and were about 5 inches apart as measured from their center line. The cathode grids were movable to the extent of 2 inches at 1 inch intervals, but generally were placed about 2 to 2½ inches from the center line of the anodes.

The second bank is similar to the first except that nine ferrosilicon anodes (6 inches apart) were used in the space so that the center line of the cathodes was between about 3 to 3½ inches. The third bank consisted of 5 ferrosilicon anodes in one plane spaced 10 inches apart and also transverse the flow of the water. These anodes were placed about 3 to 4 inches above one cathode grill which was also about 4 inches from the tank bottom. The fourth bank consisted of four ferrosilicon anodes spaced 12 inches apart, all on one plane, about 4 to 5 inches above one cathode. This cell, at the effluent end, was placed at about a 45° angle with one end of the grid about 4 inches from the bottom of the tank and the top edge approaching the surface of the water. The top of the flotation tank contains skim bars to remove the flocculated particles from the top of the tank while clear water was discharged below the skimming means, but at a level of about 5 feet from the tank bottom.

Rectified AC current of about 10 volts and high amperage was utilized. In the first bank, the upper and lower current limits where about 60–150 amps. The current carrying limits of the second bank were about 50–100 amps. The third bank employed about 15–40 amps while the last bank used 10–20 amps. A more meaningful language is that the influent section, covering an area of approximately ¼ of the tank bottom, had a current density of between about 5–10 amps per square foot of tank bottom. Section 2, also covering about ¼ of the tank bottom, carried a current density in the range of 2–5 amps per square foot of tank bottom. Section 3 had current densities in the range of ½ to 1 amp per square foot while the effluent section had current densities in the range of 1/10 to 5/10 amps per square foot. When the current was turned on, electrolysis of the water took place producing microbubbles of oxygen and hydrogen in appreciable amounts which carried the particles to the surface. The tank was enclosed in a housing or chamber and the hydrogen vented to the atmosphere. About 6 cubic feet per hour of hydrogen was vented.

Energy input can also be delivered through electrode pairs, i.e., an anode and cathode rod where the distance (surface to surface) between electrodes in each electrode pair is no less than about 0.25 inches nor usually greater than 4 inches. Very good results are obtained at 1 inch distances. To obtain the energy gradient, these electrode pairs are spaced at larger distances as the waste water passed through the treatment tank thus producing a gradual gradient.

In a typical tank 20 feet long and 8 feet wide a series of electrode pairs 1 inch apart between anode and cathode can be used. Distance between the first electrode pair and the second electrode pair is 4 inches, that between the second electrode pair and the third electrode pair is 8 inches, between the third electrode pair and the fourth electrode pair is 12 inches, and so on with distances between consecutive electrode pairs always increasing about 4 inches. This kind of energy distribution is gradual rather than step-down. Thus energy input in the treatment tank is made up of small packages (electrode pairs) and the density of these pairs are varied to provide the desired energy gradient. Usually, the energy input at the influent section of the tank, based on area of tank bottom should lie between about 40 and 120 watts (preferable 50–100 watts) while at the effluent portion of the tank energy input will range from about 4 to 12 watts (preferable 5–10 watts) per square foot when 10 volts is used.

In a specific example, a tank 25 feet long, 6 feet deep and 8 feet wide was divided into 4 sections. Each section was 8 feet by 4 feet leaving 9 feet at the influent end to be used as the floc chamber and for baffles. The first section (nearer the influent end) had 9 rod-shaped Duriron electrodes 2⅜ inches in diameter and 7 feet long spaced equally over 4 feet and transverse the flow of water. The second section employed 7 electrodes, section 3 had 5 electrodes while section 4 used 4 electrodes. The electrodes in these sections were equally spaced apart and were alternately anodes and cathodes connected in parallel. Current drawn in each of the 4 sections was approximately 150 amperes, 75 amperes, 40 amperes and 20 amperes. Ten volts was employed and common to all 4 sections. Waste water, high in protein and fats from a meat packing plant was treated. Properties of entering and leaving water from the tank was as follows:

| | Influent Waste Water | Effluent Water |
|---|---|---|
| 1. Hexane extractables | 5,230 ppm | 30 ppm |
| 2. Suspended solids | 4,300 ppm | 100 ppm |
| 3. pH | 7–12 | 6.5–7.5 |

Energy input in each section is:

Section 1—48 watts/square foot of tank bottom.

Section 2—24 watts/square foot of tank bottom.

Section 3—12 watts/square foot of tank bottom.

Section 4—6 watts/square foot of tank bottom.

Generally speaking, the higher the current density the smaller the diameter of the microbubbles formed at the cathodes and anodes. It is desired to have small bubbles, and, accordingly, it is preferred that the size of the bubbles will vary between 10 microns and about 250 microns with the bulk ranging about 100 microns when a cathodic current density of 12 amperes per foot squared is used. The bubbles, having a density lighter than water, tend to rise and carry the floc to the surface where it is skimmed off.

The higher concentration of colloidal particles require stronger current densities and, accordingly, as the number of the colloidal particles diminish, the amount of current required will fall off. This is why large current densities are used in the influent end as compared to lower current densities at the effluent end. The electroflocculation process takes full advantage of a cloud of charged "microbubbles" formed on both the anodes and cathodes. These bubbles are uniformly distributed throughout the tank and therefore provide uniform lift in rising the relatively charge-free floc to the surface. While the bubbles are uniformly distributed throughout the body of water, current distribution throughout the tank is not uniform.

There is a pH lowering effect that takes place at the anodes which often breaks the fat-water emulsion. After the emulsion is broken, the fat will rise to the surface. Coalescence of the fine particles is also aided by the addition of charged positive particles, i.e., iron, aluminum, calcium ions along with an anionic polymer. Particle precipitation, floc formation, particle flotation, impressed current and electrolysis are dynamic systems. In the process of this invention, the influent section is mainly used to neutralize the negative charge of foreign particles and to lift the flocs in the presence of high water turbulence. In the next section of the tank, a second electrochemical cell is used to coalesce remaining loose floc under intermediate turbulence. In Section 3, loose residual floc is floated to the surface under low turbulence. Section 4 is used to force unmanageable floc to rise and remain at the surface. Unmanageable floc is referred to as floc with considerable electrostatic charge. This floc cannot be readily raised and held on the first 3 sections because the turbulence is too high. Very low turbulence is present in section 4.

Obviously many modifications and variations of the invention as hereinbefore set forth may be made without departing from the spirit and scope thereof, and, therefore, only such limitations should be imposed as are indicated in the appended claims.

I claim:

1. A process for coagulating, agglomerating, and floating suspended and dissolved material in a waste water comprising flowing a waste water containing suspended and dissolved material through a flow path along an electrode grid within a tank, supplying an electric current gradient along said electrode grid, said electric current gradually diminishing in density along said flow path, the greatest density being at the influent end of the flow path, contacting said flowing waste water with said electrode grid and said gradually diminishing gradient of average current densities, forming microbubbles by electrolytically decomposing the waste water, and creating high water turbulence within the waste water only at the influent end, said high water turbulence being created and maintained within the grid iteself and thereabove by the microbubbles formed by said influent end greatest current density.

2. The process of claim 1 wherein the average current density at the influent end of the flow path is about 3–20 amps per square foot of tank bottom.

3. The process of claim 1 wherein the influent section of the flow path possesses about 40 to 120 watts per square foot of corresponding tank bottom and effluent portion of the flow path possesses about 4 to about 12 watts per square foot of corresponding tank bottom.

4. The process of claim 1 wherein the electrode grid consists of a plurality of electrode pairs positioned at intervals that gradually increase along said flow path.

5. The process of claim 1 wherein the current density at the effluent end of the flow path is about 0.4 to 1.2 amps per square foot of tank bottom.

6. The process of claim 1, wherein the waste water is from a meat treating operation and contains emulsified charged particles of fat and oil.

7. The process of claim 1, wherein a multivalent metal ion is added to the waste water to aid in flocculation.

8. The process of claim 1, wherein the polyacrylamide flocculating agent is added to the solution to aid in making solids rise to the surface of the waste water.

9. The process of claim 1 wherein said current density at the influent end of the flow path is about 4–12 amps per square foot of tank bottom.

10. A process for separating suspended and dissolved material from waste water which comprises passing a waste water containing suspended and dissolved material through a receptacle having an inlet end and an outlet end and having a plurality of electrode banks of cells near the bottom of the receptacle, impressing the waste water with an electrical current that is passed through the electrode banks, said current being sufficient to produce a different current density along each bank, said current density being greatest at the bank located closest to the inlet end, producing microbubbles by electrolytically decomposing said waste water whereby the waste water is subjected to a plurality of current densities decreasing in density as the water passes from the inlet end to the outlet end, and creating high water turbulence within the waste water only at the inlet end, said high water turbulence being created and maintained within the electrode bank closest to the inlet end and thereabove by the microbubbles produced by said greatest current density at the inlet end bank.

11. The process of claim 10 wherein the current density of each succeeding bank is approximately one-half of that of the previous bank.

12. The process of claim 10 wherein a multivalent metal ion is added to the waste water to aid in flocculation.

13. The process of claim 12 wherein the flocculating agent is a copolymer of from 90% to 50% by weight of acrylamide or methacrylamide and from 10 to 50% by weight acrylic or methacrylic acid or water-soluble salt thereof.

14. The process of claim 10 wherein a flocculating agent is added to the solution to aid in making solids rise to the surface.

15. The process of claim 10 wherein 3–20 amps per square foot of receptacle bottom are employed at the inlet end.

16. The process of claim 10, wherein the waste water is from a meat treating operation and contains emulsified charged particles of fat and oil.

17. The process of claim 10, wherein said current density at the inlet end is about 5–10 amps per square foot of receptacle bottom.

* * * * *